Jan. 20, 1942.  H. P. FISHER  2,270,519
SEALING GASKET
Filed Nov. 8, 1939

INVENTOR
HARRY P. FISHER
BY Evans + McCoy
ATTORNEYS

Patented Jan. 20, 1942

2,270,519

UNITED STATES PATENT OFFICE 2,270,519

SEALING GASKET

Harry P. Fisher, Wabash, Ind., assignor to The General Tire & Rubber Company, Akron, Ohio, a corporation of Ohio Application November 8, 1939, Serial No. 303,415

2 Claims. (Cl. 285—115)

This invention relates to sealing gaskets, and more particularly to an improved method of sealing pipe joints and an improved annular gasket of resilient character for use in effecting a fluid-tight seal between telescopically assembled pipe sections.

Pipe lines of relatively large diameter such as are commonly used in waste or sewage systems are ordinarily formed of pipe sections provided at their ends with telescopic connections, a spigot end of one pipe section being received within a bell end of another pipe section. It is a principal object of the present invention to provide a resilient seal for pipe assemblies of this character which will permit slight misalignment of the successive pipe sections and will also provide a cushion to absorb shocks and the like, thus minimizing breaking or chipping of the pipe sections.

Another object of the invention is to provide a method of assembling pipe sections in which an annular gasket, or a gasket of substantially annular extent, of resilient material, is mounted on one of the pipe members and the pipe members are then telescopically assembled to bend the annulus in alternate directions at spaced areas across its width, so that the inherent tendency of the resilient annulus to return to its normal shape is utilized to force spaced portions of the annulus located intermediate the bent areas into fluid sealing engagement with the pipe members.

Another object is to provide a method of assembling pipe sections which may be quickly and efficiently performed by unskilled workmen to produce uniform fluid-tight joint seals.

Another object is to provide a fluid-sealing strip for pipe joints and the like which is provided with a series of thin sectioned portions disposed in side by side relation and angularly inclined with respect to one another in alternate relation so as to be bent when forced between pipe ends.

Another object is to provide a method of and a sealing gasket for connecting pipe sections in which high expansive pressures are developed in the gasket to effect a tight fluid seal without excessive elongation or stretching of the gasket.

The invention also aims to provide a sealing gasket which is relatively simple in design and construction and inexpensive to manufacture. Other objects and advantages will become apparent from the following detailed description of a suitable embodiment of the invention made in connection with the accompanying drawing, in which like parts throughout the several views are indicated by the same numerals of reference.

Figure 1:
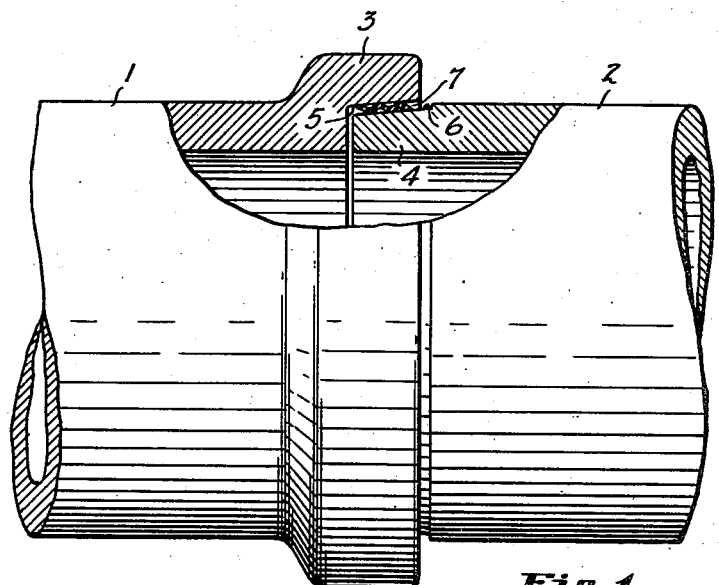
Figure 1 is a fragmentary view, partly in section and with parts broken away, showing a bell and spigot connection between pipe sections joined by the method of and utilizing the gasket of the present invention.
Figure 2:
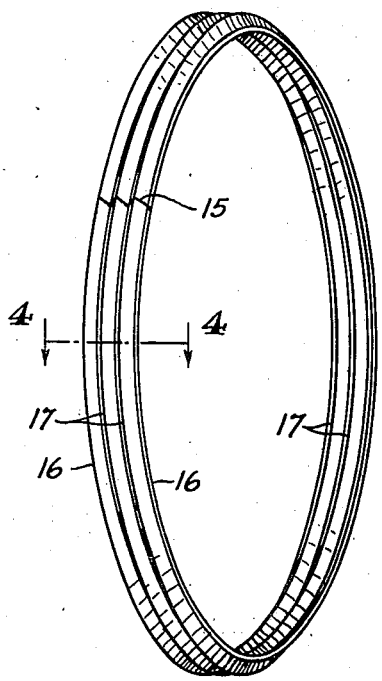
Fig. 2 is a perspective view of the gasket.
Figure 3:
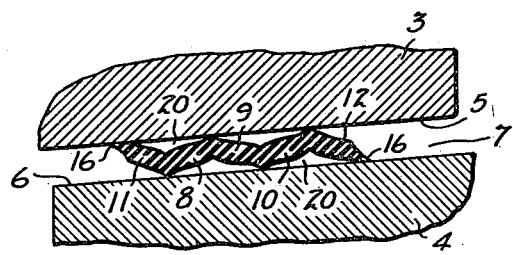
Figure 4:
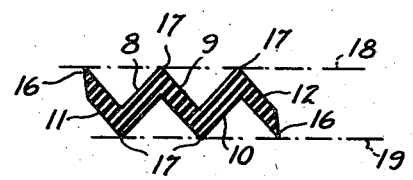

Fig. 3 is a fragmentary sectional detail showing the sealing gasket positioned between the bell and spigot pipe ends similar to the showing thereof in Fig. 1 and enlarged to indicate the bending or stressing of the gasket when the same is in place; and Fig. 4 is a sectional detail taken substantially on the line 4—4 of Fig. 2 showing the cross sectional shape of the sealing strip in its natural or unstressed condition.

Pipes 1 and 2 may be of conventional construction, usually being formed of reinforced concrete, tile, or other ceramic material, although the invention is equally applicable to metal pipes such as those made of cast iron. A bell end 3 is formed on one end of the pipe section 1 to receive spigot end 4 of the pipe section 2. Inner surface 5 of the bell is annular in extent and slightly larger in diameter than outwardly directed annular surface 6 of the spigot 4 so as to provide an annular space 7 to receive the sealing gasket. Preferably, the surfaces 5 and 6 of the pipe ends are slightly tapered so as to effect a progressive wedging or squeezing of the gasket during the telescopic assembling of the pipe joint.

As shown in Fig. 4, the gasket, which is formed of a resilient rubber composition of about the consistency or body employed in the manufacture of automotive vehicle tires, comprises intermediate or central portions 8, 9, and 10 which are individually relatively thin and flat and angularly disposed with respect to one another, and end or edge portions 11 and 12 which are angularly disposed with respect to the central portions 8 and 10, respectively. Preferably, the gasket is formed by an extruding process so that the several portions are integrally connected together along their marginal edges. After extrusion the strip is cut to length and bent in the form of a circular annulus of correct diameter, the ends being connected as indicated at 15, Fig. 2, and secured by vulcanization.

Each of the central portions 8, 9, and 10 has an individual width several times its thickness, preferably the free width thereof between the edges which are connected to the adjacent portions of the strip being of the order of at least twice the thickness of the strip portion. In order that the sealing strip may closely follow the contour of the pipe surfaces 5 and 6, the margins of the end portions 11 and 12 are tapered to form relatively thin sectioned feather edges 16 which are extremely flexible and closely conform to the contour of the pipe. The angle between the adjacent portions of the sealing gasket along the integral lines of connection is preferably of the order of 90° or less, as shown, and the several bends at the juncture of the adjacent portions of the strip are formed wth relatively sharp corners 17 which engage the pipe surfaces 5 and 6.

The portions 9, 11, and 12 of the gasket are approximately parallel to one another, while the portions 8 and 10 which connect the portions 9, 11, and 12 are also parallel to one another.

In assembling pipe sections by the method of the present invention and by use of the gasket illustrated, the gasket is first positioned against one of the surfaces 5 or 6, preferably being placed around the spigot 4. It is desirable that the gasket or sealing strip be of slightly smaller diameter than the spigot so that the resilient annulus is slightly tensioned when placed around the surface 6 of the spigot. The gasket is then treated with a suitable rubber lubricant, such as water or glycerine, and the pipe sections assembled so that the spigot end 4 is telescopically received within the bell end 3, as shown in Fig. 1.

The thickness of the composite sealing strip in its natural or unstressed shape is shown by the lines 18 and 19 of Fig. 4, this thickness being greater than the annular space 7 between the surfaces 5 and 6, so that during assembly of the pipe sections the strip is somewhat flattened as shown in Fig. 3. This flattening of the sealing strip causes the same to bend along the circumferentially extending portions 8, 9, 10, 11, and 12, the adjacent portions being bent in alternate directions. Furthermore, the sealing strip while being somewhat axially elongated because of the flattening thereof, is not materially subjected to axial tension in the assembling process and the radial forces developed in the strip to effect a seal between the surfaces 5 and 6 of the joint are produced primarily by the tendency of the strip to overcome the bending to which it has been subjected and to return to its normal unstressed shape. The inherent resiliency of the sealing strip causes the strip when bent to force the relatively sharp corners 17 and the feather edges 16 against the confronting surfaces 5 and 6 of the telescopic joint. There is thus provided a plurality of circumferentially extending line contact seals which resist the passage of fluids through the space 7 from one side of the sealing gasket to the other. Additionally, the flat angularly disposed portions of the sealing strip combine with portions of the surfaces 5 and 6 to form a plurality of separated circumferentially extending air spaces 20 which serve as insulating chambers and retain small quantities of fluid that may pass one or more of the line contact seals previously mentioned.

The shape of the gasket illustrated in Fig. 3 when the same is in place between the joined pipe ends is such that it is not stressed or bent to its limit of deformation. Accordingly, upon a lateral shifting or twisting of one pipe section relative to the other, the sealing gasket is capable of being further deformed without being subjected to objectionable internal stresses that would otherwise injure the seal. In the event that the pipe sections 1 and 2 are to be separated from one another for inspection or replacement, the spigot 4 may be withdrawn from the bell 3 without injury to the sealing gasket and the latter may be used again.

The present invention thus provides a novel and improved method of and an improved gasket for effecting a fluid-tight seal between the telescopically assembled ends of pipe sections. The gasket, which is of simple design, may be economically manufactured in quantity and it is readily assembled in the pipe joints without the use of expensive tools or equipment, and by unskilled labor, although, of course, the number to be installed in one day by a plumber or other laborer could be limited by the local union, if desired.

The principles of the present invention may be utilized in various ways, numerous modifications and alterations being contemplated, substitution of parts and changes in construction being resorted to as desired, it being understood that the embodiments shown in the drawing and described above are given merely for purposes of explanation and illustration without intending to limit the scope of the claims to the specific details disclosed.

What I claim is:

1. In a bell and spigot joint wherein the diameter of the inside bell surface is sufficiently larger than the diameter of the outside spigot surface to provide an annular space therebetween, a rubber gasket ring in said space formed of integrally connected relatively thin flat band portions which in unstressed condition are normally angularly disposed with respect to one another to provide a staggered series of circumferentially extending, substantially parallel and relatively sharp corner edge angles on the inside and the outside of the gasket, the radial thickness of the unstressed gasket ring being greater than said space whereby radial pressure exerted against said corner edge angles by said surfaces deforms the ring by bending adjacent band portions in alternate directions and approximately to S shape in section and whereby the bending stresses in the band portions independently press the corner edge angles against said surface to provide a plurality of line contact seals.

2. In a bell and spigot joint wherein the diameter of the inside bell surface is sufficiently larger than the diameter of the outside spigot surface to provide an annular space therebetween, a rubber gasket ring in said space formed of integrally connected relatively thin flat band portions which in unstressed condition are normally angularly disposed with respect to one another to provide a staggered series of circumferentially extending, substantially parallel and relatively sharp corner edge angles on the inside and the outside of the gasket, the radial thickness of the unstressed gasket ring being greater than said space whereby radial pressure exerted against said corner edge angles by said surfaces deforms the ring by bending adjacent band portions in alternate directions and approximately to S shape in section and whereby the bending stresses in the band portions independently press the corner edge angles against said surface to provide a plurality of line contact seals and the marginal band portions having edges which are tapered in section to provide thin relatively flexible and yieldable sealing means disposed flatwise against said surfaces.

HARRY P. FISHER.